United States Patent Office 2,899,359
Patented Aug. 11, 1959

2,899,359

SUBSTITUTED-2,3,4,5 TETRAHYDRODIAZEPINE COMPOUNDS AND PHARMACEUTICAL COMPOSITIONS THEREWITH

Otis E. Fancher and Gust Nichols, Elkhart, Ind., assignors to Miles Laboratories, Inc., Elkhart, Ind., a corporation of Indiana No Drawing. Application January 23, 1957
Serial No. 635,608

8 Claims. (Cl. 167—65)

This invention relates to novel compositions and to method of preparing and using the same. More particularly, the invention relates to compositions having unique sedative activity which are particularly useful in the alleviation of nervous tension and anxiety in human beings.

The compounds with which the present invention deals are represented by the formula:

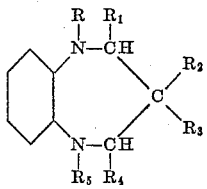

wherein R and $R_5$ are hydrogen, and the $R_1$, $R_2$, $R_3$ and $R_4$ substituents are selected from the group consisting of hydrogen and lower alkyl, and the non-toxic water soluble salts thereof.

A detailed description of methods of preparing these compounds is set forth in the following examples.

EXAMPLE I

*2-methyl-1,5-benzo-2,3,4,5-tetrahydrodiazepine*

The intermediate 2 - oxo - 4 - methyl - 1,5 - benzo-2,3,4,5-tetrahydrodiazepine was prepared according to a procedure recently described by Ried and Urlass, Ber., 86, 1101 (1953).

44 g. of 2-oxo-4-methyl-1,5-benzo-2,3,4,5-tetrahydrodiazepine was placed in sintered glass Soxhlet apparatus and extracted with 500 ml. of dry tetrahydrofuran containing 19 g. of lithium aluminum hydride. Extraction was complete in one hour and refluxing was containued for an additional hour. Ethyl acetate was added to decompose the excess hydride. The mixture was made strongly alkaline with 10% sodium hydroxide and the organic material was separated from the precipitated aluminum hydroxide and water. The tetrahydrofuran was removed by distillation at reduced pressure and the residue was extracted with ether. The ether solution was washed with dilute sodium hydroxide then with water and dried over anhydrous potassium carbonate.

Addition of ethereal hydrogen chloride precipitated the dihydrochloride. This was dissolved in water, carboned and made basic with ammonia. The 2-methyl-1,5-benzo-2,3,4,5-tetrahydrodiazepine which precipitated weighted 33 g. This was crystallized from Skellysolve B (petroleum ether, B.P. 60–90° C.) as colorless platelets which melted at 100–102° C. Percent N found, 17.05; calculated for $C_{10}H_{14}N_2$, 17.38%.

The free base was converted to the dihydrochloride by treatment with ethereal hydrogen chloride. The dihydrochloride was crystallized from ethanol as colorless crystals which melted at 221–223° C. with decomposition. Percent N found, 11.74; calculated for $C_{10}H_{16}N_2Cl_2$, 11.91%.

Substituents at positions 2 and 4 are varied by selection of an appropriate β-diketone. By hydrogenation of the reaction product of o-phenylenediamine and 1,3-cyclohexanedione, a 2,4-endopropylene derivative results. With acetylacetone, a 2,4-dimethyl substituted member of the group is produced as shown in the following example:

EXAMPLE II

*2,4-dimethyl-1,5-benzo-2,3,4,5-tetrahydrodiazepine*

Acetylacetone, 16.7 g., was reacted with o-phenylenediamine, 18.1 g., according to the procedure described by Thiele and Steimmig, Ber., 40, 955 (1907) to yield an unsaturated intermediate. The hydrochloride of this intermediate was dissolved in 95% alcohol and reduced at an initial hydrogen pressure of 4 atmospheres using a platinum oxide catalyst. The catalyst was removed by filtration and the alcohol was removed at reduced pressure. The residue was dissolved in isopropyl alcohol, carboned, filtered and chilled. The product separated as pale yellow crystals, melting at 234–236° C. with decomposition. Percent N found, 12.99; calculated for $C_{11}H_{16}N_2 \cdot HCl$, 13.17%. Percent Cl found, 16.32; calculated for $C_{11}H_{16}N_2 \cdot HCl$, 16.67%.

Diamides can be prepared by reaction of o-phenylenediamine with a malonic ester or with a mono- or di- substituted malonic ester. With an unsubstituted malonic ester the reaction product, when reduced, will yield 1,5-benzo-2,3,4,5-tetrahydrodiazepine. By employing mono- or di- substituted malonic esters either one or both of the $R_2$ and $R_3$ as alkyl substituents are introduced into the generic formula set out above.

In a related way, o-phenylenediamine, when reacted with mesoxalic ester, results in a ketodiamide with the 3-keto group being preferentially reduced to methylene, further reduction similarly reducing the keto groups at positions 2 and 4.

EXAMPLE III

*1,5-benzo-2,3,4,5-tetrahydrodiazepine dihydrochloride*

288 g. of o-phenylenediamine in 670 ml. of pyridine was treated with 1013 g. of p-toluenesulfonyl chloride dissolved in 1333 ml. of pyridine at such a rate that the temperature was maintained at 60–65° C. The reaction mixture was then refluxed for 1 hour. After standing overnight at room temperature the reaction mixture was then poured into 9340 ml. of 15% hydrochloric acid. The granular solid which separated was filtered and dried. Crystallization from glacial acetic acid gave 960 g. of N,N' - bis - p - toluenesulfonyl - o - phenylenediamine, M.P. 206–208° C.

34.5 g. of metallic sodium was dissolved in 2400 ml. of boiling n-butyl alcohol. To this solution was added 306 g. of the above sulfonamide over a period of two hours. After the addition was completed the mixture was refluxed for 1 hr. 227 g. of trimethylenedibromide was added and the mixture was refluxed for 1 hour. The white solid product was filtered, washed with 3% sodium hydroxide, then with hot water and dried. A yield of 300 g. of 1,5-di-p-toluenesulfonyl-1,5-benzo-tetrahydrodiazepine having a M.P. of 200–202° C. was obtained.

The above product was added to 2000 g. of 70% sulfuric acid, and 30 ml. of water which was saturated with $SO_2$ was added, and the mixture heated to reflux. An additional 200 g. of the sulfonamidodiazepine described above was added, together with an additional 20 ml. of water which was saturated with $SO_2$. Refluxing was continued for 4½ hours. The filtered reaction mixture was made alkaline by the addition of sodium hydroxide flakes (1200 g.). The solid amine which separated was extracted with ether, dried over potassium carbonate and distilled. 145 g. of 1,5-benzo-2,3,4,5-tetrahydrodiazepine, boiling point 116–117° C. at 0.2 mm. was obtained. The free base dissolved in 500 ml. of hot methanol was treated with methanolic hydrochloric acid. The solid dihydrochloride which separated was recrystallized from methanol to give 196 g. of the pure dihydrochloride melting at 223–225° C. Percent chlorine found—31.86, calculated for $C_9H_{14}Cl_2N_2$, and 32.07.

Compositions which are useful in the practice of our invention are conveniently and easily produced by combining a compound of the class hereinbefore described with fillers, carriers, extenders and/or excipients, such as are generally used in the preparation of pharmaceutical products which are to be taken orally or given parenterally, especially for human use. The compounds may be used in the form of the free base or of the salts of acids which are water-soluble and non-toxic, such as the hydrochloride, sulfate and the like. The compositions may be either in solid or liquid state and may be compounded as tablets, powders, capsules, suspensions and similar dosage forms, particularly useful for oral ingestion. In such form the composition may be prepared by mixing the foregoing compounds either in the form of a free base or the water-soluble non-toxic salt, with such common diluents or tableting adjuncts as cellulose powder, cornstarch, lactose, talc, stearic acid, magnesium stearate, gums and the like, in accordance with conventional manufacturing practices common in the art.

Where the product is to be administered parenterally, the compounds, preferably in the form of their non-toxic water soluble salts, may be associated with such carriers as water, saline solution, glucose solution and the like.

We have found that for oral administration a suitable dosage unit is from about 50 to 300 milligrams of the compound per tablet, capsule or other dosage form. Where the material is to be administered parenterally then a suitable dosage unit would be from about 25 to 300 milligrams of the active ingredient.

Dosages as above described may be administered as frequently as conditions demand and it is understood, of course, that for children the dosages are correspondingly smaller, depending upon the age and weight of the child, as those skilled in the art will appreciate.

The following examples will illustrate in detail typical procedures for preparing a number of representative dosage unit forms of our compositions in accordance with this invention:

EXAMPLE IV

A pharmaceutical composition having the following formulation was prepared.

|  | Mg. |
|---|---|
| 2-methyl-1,5-benzo-2,3,4,5-tetrahydrodiazepine dihydrochloride | 50.0 |
| Lactose | 200.0 |
| Magnesium stearate | 5.0 |

The diazepine derivative is mixed with the lactose and thoroughly wetted with water. The wetted material is then pressed through a sieve of the desired size and dried in an oven at about 140° F. When dry the magnesium stearate is added and the composition is dry-mixed thoroughly. The mixed material is then compressed into tablets.

It will be understood that the above example is only representative of one specific form of this invention. Other excipients such as sucrose, sodium chloride, kaolin, dicalcium phosphate and the like may be used. The excipient may be present in amounts varying from about 30 to 300 parts by weight, depending upon the final formulation. Instead of magnesium stearate as the lubricant, stearic acid, boric acid, and the like are operable. For best results from about 2 to 10 parts by weight of the lubricant is used. It will be understood that any of the diazepine derivatives described above may be used as the active ingredient of the composition. Depending on the dosage unit desired, from 50 to 300 parts of the desired compound will be used.

EXAMPLE V

For capsules, the following formulation was used:

|  | Mg. |
|---|---|
| 1,5-benzo-2,3,4,5-tetrahydrodiazepine dihydrochloride | 500.0 |
| Lactose | 1000.0 |
| Talc | 75.0 |

This material was prepared as described in Example V above, that is, the diazepine derivative and the lactose were wetted, sieved, dried and mixed with the talc. Capsules each containing 50 mg. of the active ingredient were prepared.

This application is a continuation-in-part of our co-pending application Serial No. 474,591, filed December 10, 1954, now abandoned.

We claim:

1. An article of manufacture comprising a quantity of from about 25 to 300 milligrams of a compound selected from the group consisting of diazepine derivatives having the general formula:

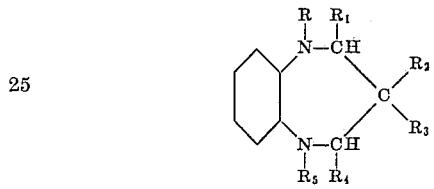

wherein R and $R_5$ are hydrogen, $R_1$, $R_2$, $R_3$, and $R_4$ are selected from the group consisting of hydrogen and lower alkyl, and non-toxic water-soluble salts thereof, with a pharmaceutical carrier, in dosage unit form.

2. The method of inducing sedation in human beings comprising administering internally to a human being a unit form of a diazepine derivative having the generic formula:

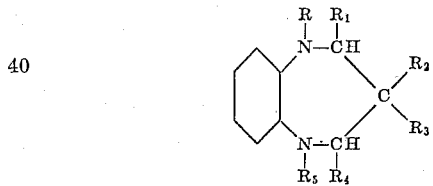

wherein R and $R_5$ are hydrogen, $R_1$, $R_2$, $R_3$, and $R_4$ are selected from the group consisting of hydrogen and lower alkyl, and the water-soluble non-toxic salts thereof, in an amount ranging from about 25 to 300 milligrams of the said compound.

3. An article of manufacture comprising a quantity of from about 25 to 300 milligrams of a member selected from the group consisting of 2-methyl-1,5-benzo-2,3,4,5-tetrahydrodiazepine and non-toxic water-soluble salts thereof, with a pharmaceutical carrier.

4. An article of manufacture comprising a quantity of from about 25 to 300 milligrams of a member selected from the group consisting of 2,4-dimethyl-1,5, benzo-2,3,4,5-tetrahydrodiazepine and non-water-soluble and non-toxic water-soluble salts thereof with a pharmaceutical carrier.

5. An article of manufacture comprising a quantity of from about 25 to 300 milligrams of a member selected from the group consisting of 1,5-benzo-2,3,4,5-tetrahydrodiazepine and non-toxic water-soluble salts thereof with a pharmaceutical carrier.

6. A compound selected from the group consisting of diazepine derivatives having the structure

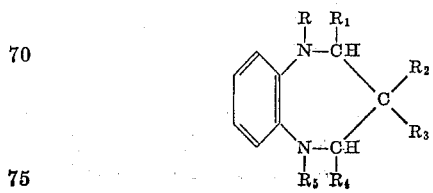

wherein R and $R_5$ are hydrogen and the $R_1$, $R_2$, $R_3$, and $R_4$ substituents are selected from the group consisting of hydrogen and lower alkyl, at least one of said substituents being lower alkyl, and non-toxic water-soluble salts thereof.

7. 2-methyl-1,5-benza-2,3,4,5-tetrahydrodiazepine.
8. 2,4-dimethyl-1,5-benzo-2,3,4,5-tetrahydrodiazepine.

References Cited in the file of this patent

UNITED STATES PATENTS

| | | |
|---|---|---|
| 2,067,317 | Gruber | Jan. 12, 1937 |
| 2,520,264 | Walter | Aug. 29, 1950 |
| 2,746,900 | Bavley et al. | May 23, 1956 |
| 2,763,643 | Tislow et al. | Sept. 18, 1956 |

OTHER REFERENCES

Stetter: Chem. Ber., vol. 86 (1953), pp. 197–205.